United States Patent [19]
Robinson

[11] Patent Number: 5,352,061
[45] Date of Patent: Oct. 4, 1994

[54] ANTI-ROTATION RING JOINT

[75] Inventor: Wilfred Robinson, Glendale, Ariz.

[73] Assignee: Honeywell Inc., Minneapolis, Minn.

[21] Appl. No.: 778

[22] Filed: Jan. 5, 1993

[51] Int. Cl.$^5$ .............................. F16B 2/08
[52] U.S. Cl. ........................... 403/338; 403/322;
 403/334; 403/24; 244/161
[58] Field of Search .......... 403/338, 333–336,
 403/322, 24, 13, 14, 373, 337; 244/161, 158 R;
 285/407–411

[56] References Cited

U.S. PATENT DOCUMENTS

| 2,166,412 | 7/1939 | Kiesel | 285/411 X |
| 2,214,381 | 9/1940 | Rastetter | 285/411 |
| 3,013,821 | 12/1961 | Bogan | 403/336 X |
| 4,715,565 | 12/1987 | Wittmann | 244/158 R |

FOREIGN PATENT DOCUMENTS

| 1226498 | 9/1989 | Japan | 244/161 |
| 487900 | 3/1992 | Japan | 244/161 |
| 4189700 | 7/1992 | Japan | 244/161 |

Primary Examiner—Randolph A. Reese
Assistant Examiner—Harry C. Kim
Attorney, Agent, or Firm—Thomas A. Rendos

[57] ABSTRACT

A ring joint for a space vehicle subject to vibration forces during launch having anti-rotation key means to avoid relative angular displacement of parts on each side of the ring joint gap. The ring joint includes top and bottom flanges, each flange having an axial bearing surface and a radially outer tapered surface, and includes a ring having arcuate segments, each segment having a V-shaped groove with radially inner tapered surfaces for closing a gap between the axial bearing surfaces, and includes a radial key in at least one segment disposed in the V-shaped groove thereof, for keying the ring to each flange.

1 Claim, 4 Drawing Sheets

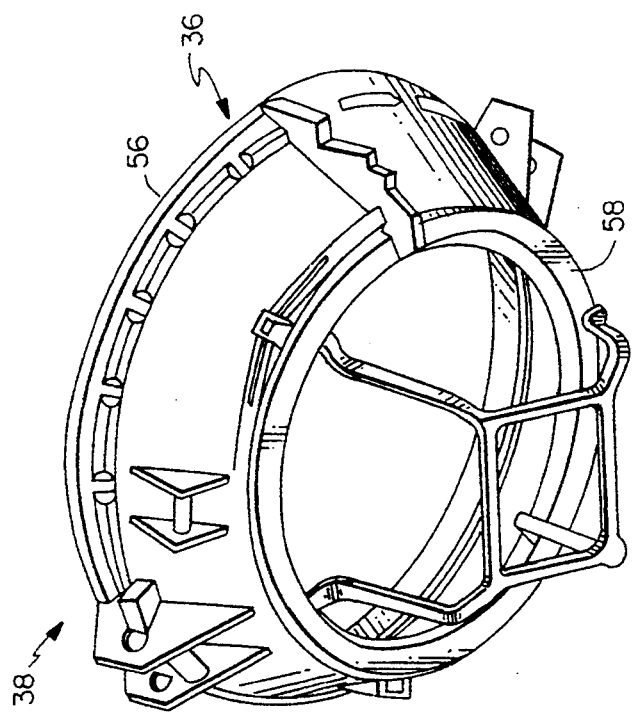
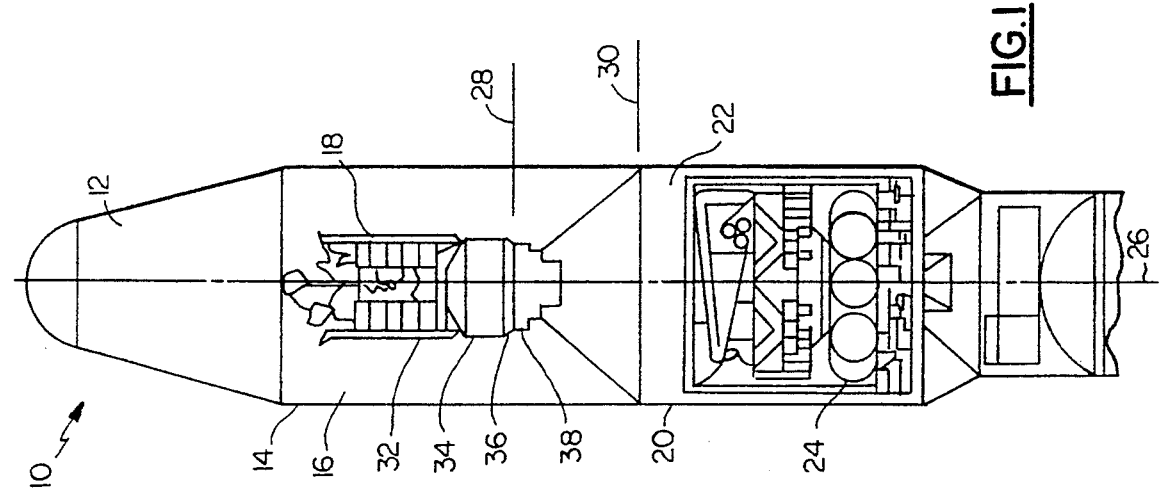

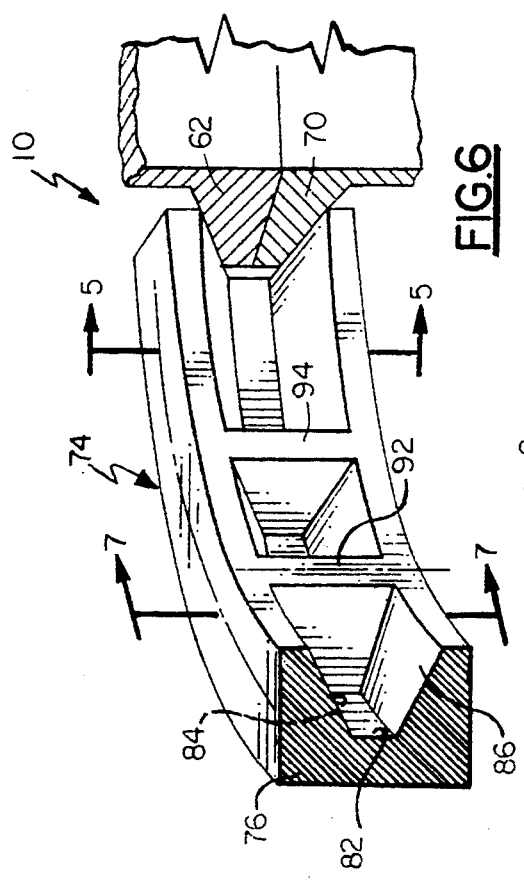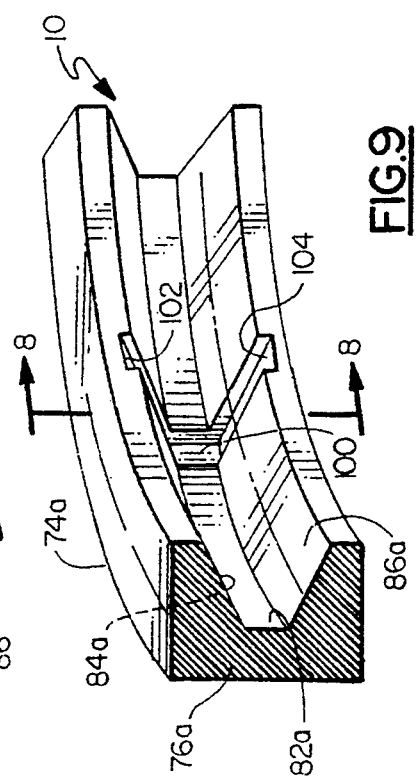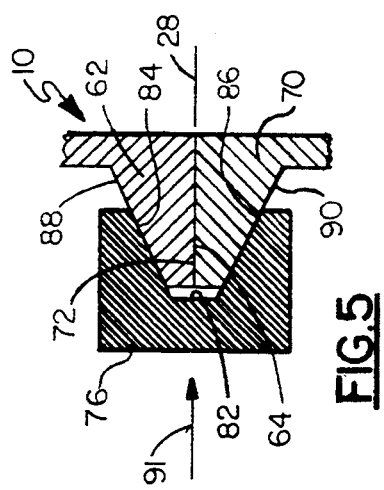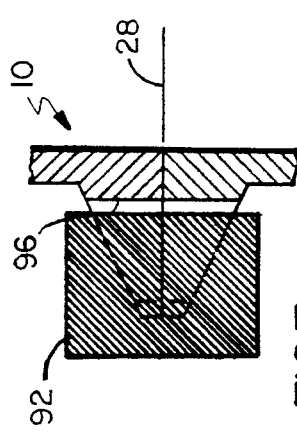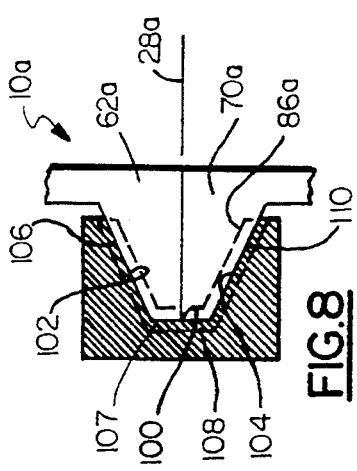

ANTI-ROTATION RING JOINT

The invention relates to a space vehicle anti-rotation ring joint, and in particular the invention relates to a space vehicle anti-rotation ring joint having a band of segments with radial lock teeth.

BACKGROUND OF INVENTION

The prior art space vehicle ring joint includes a top annular member having an axis and having a top flange with a top bearing surface and a top outer tapered surface, a coaxial bottom annular member having a bottom flange with a bottom bearing surface and a bottom outer tapered surface, said bearing surfaces having a gap therebetween, a band having a plurality of peripherally spaced band segments, each segment having a V-shaped groove with two inner tapered surfaces for bearing against the respective flange outer tapered surfaces for closing the gap by applying a force in a radially inward direction on each segment.

One problem with the prior art space vehicle ring joint is that vibration causes relative angular displacement of the top flange relative to the bottom flange in the lock condition during vehicle launch.

SUMMARY OF THE INVENTION

According to the present invention, a space vehicle ring joint is provided. This ring joint comprises a top annular member having an axis and having a top flange with a top bearing surface and a top outer tapered surface, a coaxial bottom annular member having a bottom flange with a bottom bearing surface and a bottom outer tapered surface, said bearing surfaces having a gap therebetween, a band having a plurality of peripherally spaced band segments, each segment having a V-shaped groove with two inner tapered surfaces for bearing against the respective flange outer tapered surfaces for closing the gap by applying a force in a radially inward direction on each segment, and key means disposed between at least one segment and an oppositely facing portion of the flanges.

By using the key means, the problem of relative angular displacement of the top flange relative to the bottom flange, due to vibration in the lock condition during vehicle launch, is avoided.

One object of the present invention is to provide a space vehicle ring joint having flanges in bearing with means to prevent relative angular displacement of one flange relative to the other flange due to vibration.

The foregoing and other objects, features and advantages will be apparent from the following description of the preferred embodiments of the invention as illustrated in the accompanying drawings.

BRIEF DESCRIPTION OF THE DRAWINGS

FIG. 1 is a schematic section view of a space vehicle having a lock joint according to the invention;

FIG. 2 is an exploded isometric view of a vehicle portion of FIG. 1;

FIG. 5 is an enlarged view of a portion of the lock joint of FIG. 3;

FIG. 6 is a perspective view of the lock joint portion of FIG. 5;

FIG. 7 is a section view as taken along line 7—7 of FIG. 6;

FIG. 8 is an enlarged view of a portion of a lock joint of a second embodiment of a space vehicle corresponding to the portion of a lock joint of FIG. 5;

FIG. 9 is a perspective view of the lock joint portion of the second embodiment corresponding to the lock joint portion of FIG. 8;

DESCRIPTION OF THE PREFERRED EMBODIMENT

Figure 4:
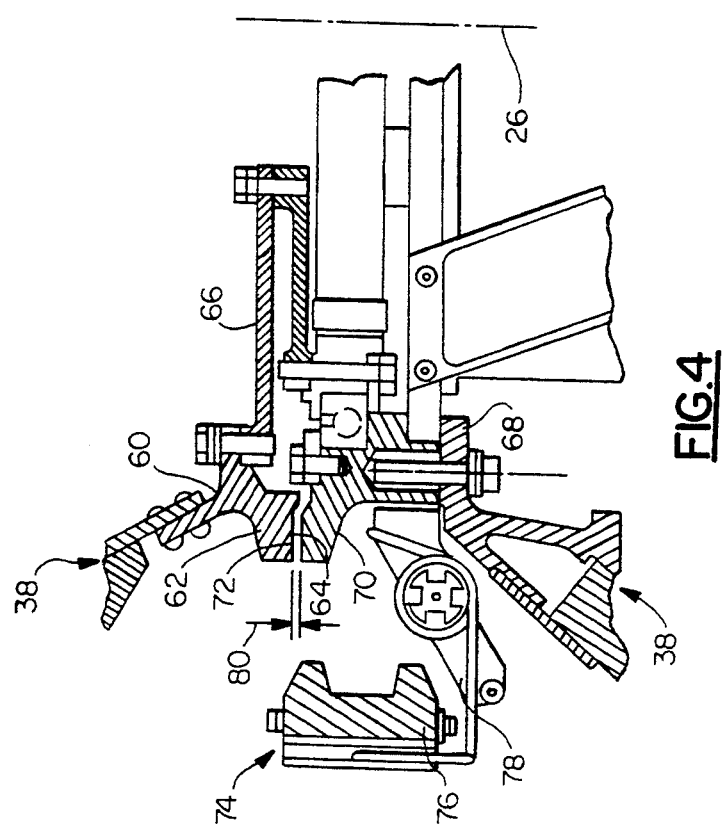
FIG. 4 is a section view of the lock joint of FIG. 3, as shown in an unlock condition.

As shown in FIG. 1, a space or launch vehicle 10, which has a fairing or cover 12, is provided. Vehicle 10 has a front portion 14, which has a first inner space 16, that has a first payload 18. Vehicle 10 also has a rear portion 20, which has a second inner space 22, that has a second payload 24. Vehicle 10 also has a longitudinal axis 26, along which parts 14, 18, 20, 24 are disposed.

First payload 18 has a forward payload separation plane 28. Fairing 12 has a payload fairing separation plane 30. First payload 18 has a payload main section 32, a kick motor 34, a motor adapter ring 36, through which plane 28 passes, and a payload spin assembly 38.

As shown in FIG. 2 which is an isometric view of payload spin assembly 38, ring 36 has a front face 56, which interfaces with a face (not shown) on kick motor 34. Assembly 38 also has a rear face 58, which interfaces with a face (not shown) on a payload adapter (not shown) on vehicle 10.

Figure 3:
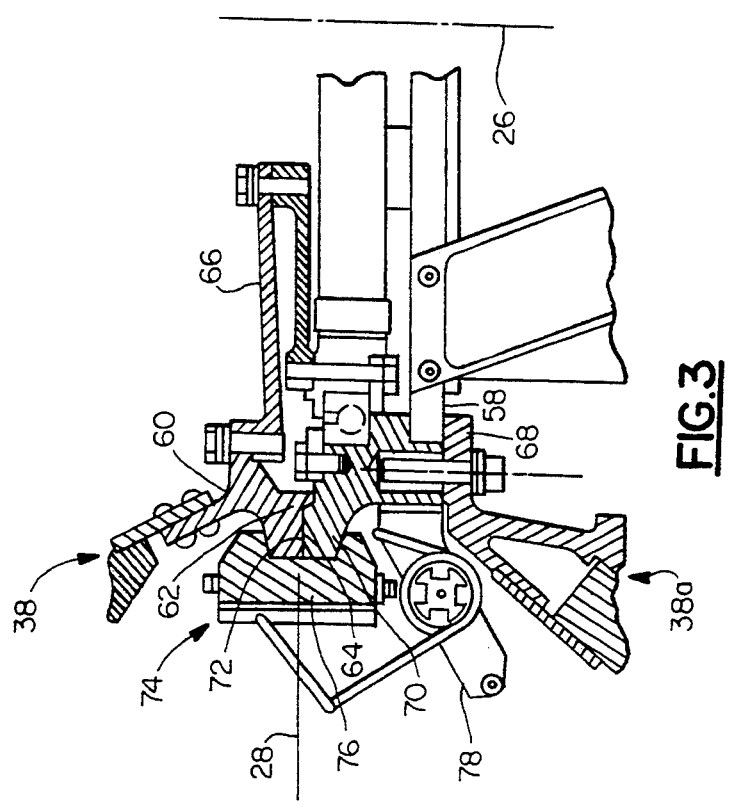
FIG. 3 is a section view of a lock joint in the vehicle portion of FIG. 2 as shown in a lock condition.

As shown in FIG. 3, payload spin assembly 38 has an annular member 60, which has a top flange 62, that has a bearing surface 64. Assembly 38 also has an off load spring unit 66. As shown in FIG. 3 the payload adaptor 38a has an annular member 68, to which is attached bottom flange 70, at rear face 58. Flange 70 has a bearing surface 72. Surfaces 64 and 72 are disposed along separation plane 28. FIG. 3 shows a zero gap between surfaces 64, 72. FIG. 3 shows a lock condition, during launch of vehicle 10. In the lock condition, the ring flanges 62, 70 are locked by lock band 74, which has two lock band segments, each of which has, for example, 3 support levers 78. Each band segment has, for example, 9 segments each like typical segment 76.

FIG. 4 shows the unlock condition during spin. The parts are the same as in FIG. 3. Bearing surfaces 64, 72 have a gap 80 therebetween. In this embodiment, gap 80 measures about 0.070 inches. In FIG. 4, the band segment 76 has been displaced away from flanges 62, 70 by its lever 78. Lever 78 is angularly displaceable, and is supported by bottom flange 70. In this embodiment, lock band 74 has, for example, eighteen segments, each segment being identical to typical segment 76. Each lever is identical to lever 78, and each lever is displaced at the same time as the other six support levers. Ring flanges 62, 70 form a ring joint.

FIGS. 5, 6 and 7 show the details of band 74 of first embodiment 10. As shown in FIG. 5, which is an enlarged view of a portion of FIG. 3, segment 76 has an inner V-shaped groove 82, which has a top tapered surface 84 and a bottom tapered surface 86. Flanges 62, 70 have corresponding tapered surfaces 88, 90, which are symmetrically disposed about plane 28. A radially inwardly directed force 91 causes bearing pressures at surfaces 84, 88 and 86, 90, that causes bearing pressure at surfaces 64, 72. As shown in FIG. 6, segment 76 has two spaced shoulders or walls or teeth 92, 94, which are disposed in groove 82, and which are selectively spaced relative to axis 26. Teeth 92, 94 fit into a slot 96 (shown in FIG. 7) and a slot (not shown), each disposed in flanges 62, 70. Each slot extends through both flanges 62, 70. Teeth 92, 94 and their slots are symmetrical about a radial line normal to axis 26 for minimizing tooth-and-slot clearances. When lock band 74 is in the lock condition, teeth 92, 94 are tightly fitted in their slots. Thus, teeth 92, 94 prevent relative angular movement about axis 26 of flange 62 relative to flange 70 due to vibration forces, in the lock condition.

FIGS. 8 and 9 show the details of a band 74a at plane 28a of a second embodiment 10a. FIGS. 8 and 9 show the lock condition of second embodiment 10a. Parts of second embodiment 10a, which are like parts of first embodiment 10, have the same numerals, but with a subscript "a" added thereto. Vehicle 10a has a lock band 74a, which has, for example, eighteen segments, like segment 76a. Segment 76a has a V-shaped recess formed by recess portions 100, 102, 104. Flanges 62a, 70a have projections or key portions 106, 107 and 108, 110. Key portions 107, 108 are received in recess portion 100. Key portion 106 is received in recess portion 102. Key portion 110 is received in recess portion 104. Thus, key portions 106, 107, 108, 110 prevent relative rotation of flange 62a relative to flange 70a about an axis (not shown) of vehicle 10a, due to vibration forces, in a lock condition.

Figure 10:
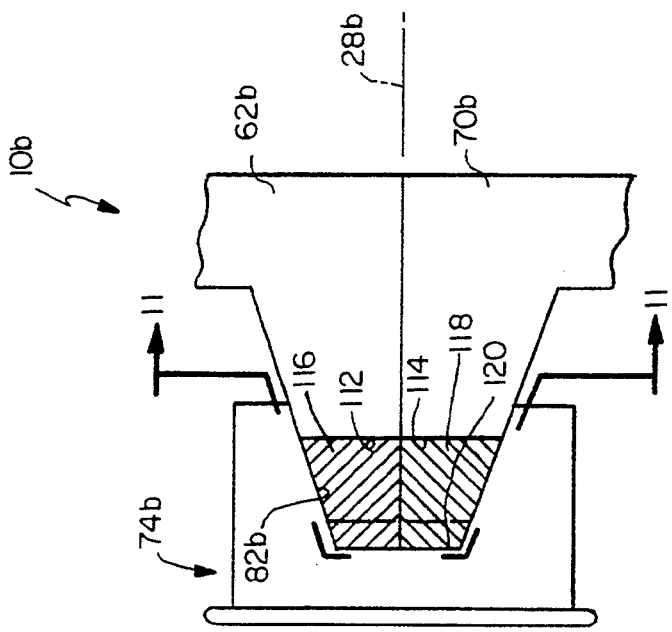
FIG. 10 is an enlarged view of a portion of a lock joint of a third embodiment of a space vehicle corresponding to the portion of the lock joint of FIG. 5.
Figure 11:
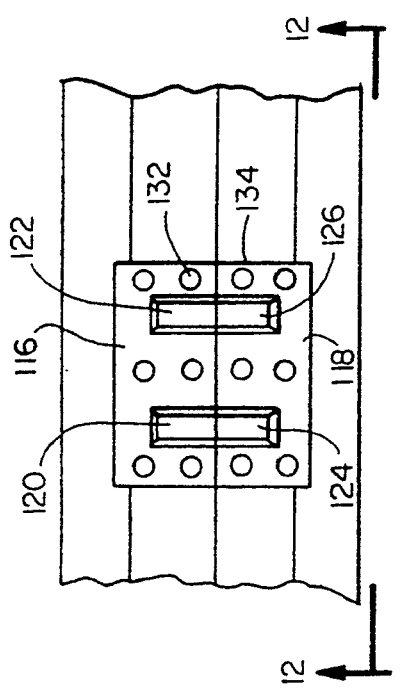
FIG. 11 is a section view as taken along line 11—11 of FIG. 10.
Figure 12:
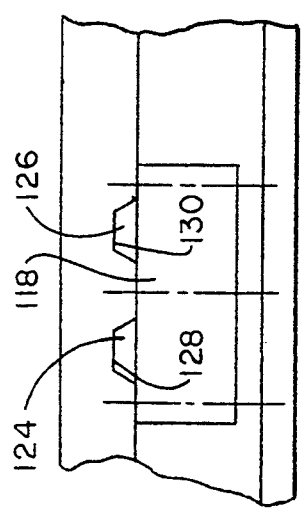
FIG. 12 is a section view as taken along line 12—12 of FIG. 11.

FIGS. 10, 11 and 12 show, in a lock condition, the details of a band 74b at plane 28b of a third embodiment 10b. In FIG. 10, the section line 11—11 for FIG. 11 is cut along a contact line, but is shown slightly offset from the contact line for ease of illustration. The contact line separates flanges 62b, 70b from band 74b. Flanges 62b, 70b have respective top and bottom machined cutouts 112, 114. Cutouts 112, 114 receive respective top and bottom blocks or inserts 116, 118. Inserts 116, 118 have respective teeth parts 120, 122 and 124, 126. Band 74b has a V-shaped groove 82b, which receives flanges 62b, 70b, in the lock condition. Groove 82b has two pockets 128, 130, which respectively receive teeth parts 120, 124 and 122, 126. Inserts 116, 118 are held in place by respective pluralities of machine bolts 132, 134. Teeth parts 120, 124 and 122, 126 are tapered in shape for easy release of band 74b from flanges 62b, 70b. Thus, teeth parts 120, 122, 124, 126 prevent relative rotation of flange 62b relative to flange 70b about a vehicle axis (not shown) due to vibration forces, in the lock condition.

While the invention has been described in its preferred embodiment, it is to be understood that the words which have been used are words of description rather than limitation and that changes may be made within the purview of the appended claims without departing from the true scope and spirit of the invention in its broader aspects.

The embodiments of an invention is which an exclusive property or right is claimed are defined as follows:

1. A ring joint for a space vehicle comprising:
   a top annular member having an axis and having a top flange with a top bearing surface, a top radially outer tapered surface and a top cutout;
   a bottom annular member coaxially disposed along the axis having a bottom flange with a bottom bearing surface, a bottom radially outer tapered surface and a bottom cutout;
   said bearing surfaces having a gap therebetween;
   a band having a plurality of peripherally spaced band segments, each segment having a V-shaped groove with two radially inner tapered surfaces for bearing against the respective flange radially outer tapered surfaces for closing the gap by applying a force in a radially inward direction on each segment, and
   key means disposed between at least one segment and oppositely facing portions of the flanges, wherein
   the key means includes top and bottom inserts fitted into respective top and bottom cutouts in the top and bottom flanges and having at least one tooth formed by top and bottom axially aligned tooth parts disposed in the top and bottom inserts and a pocket portion disposed in a groove radially inner surface disposed radially opposite thereto.

* * * * *